(12) United States Patent
Hunt

(10) Patent No.: US 12,245,550 B2
(45) Date of Patent: Mar. 11, 2025

(54) CALIBRATION SYSTEM FOR AN AGRICULTURAL HEADER

(71) Applicant: CNH Industrial America LLC, New Holland, PA (US)

(72) Inventor: Cory Douglas Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 1114 days.

(21) Appl. No.: 17/130,178

(22) Filed: Dec. 22, 2020

(65) Prior Publication Data

US 2021/0185919 A1 Jun. 24, 2021

Related U.S. Application Data

(60) Provisional application No. 62/952,920, filed on Dec. 23, 2019.

(51) Int. Cl.
| | |
|---|---|
| *A01D 41/14* | (2006.01) |
| *A01D 41/127* | (2006.01) |
| *A01D 57/04* | (2006.01) |
| *A01D 57/12* | (2006.01) |
| *G01C 25/00* | (2006.01) |
| *A01D 34/14* | (2006.01) |

(52) U.S. Cl.
CPC ......... *A01D 41/141* (2013.01); *A01D 41/127* (2013.01); *A01D 57/04* (2013.01); *A01D 57/12* (2013.01); *G01C 25/005* (2013.01); *A01D 34/14* (2013.01)

(58) Field of Classification Search
CPC .... A01D 41/141; A01D 41/127; A01D 57/12; A01D 34/14; A01D 57/04; G01C 25/005
See application file for complete search history.

(56) References Cited

U.S. PATENT DOCUMENTS

| | | |
|---|---|---|
| 4,507,910 A | 4/1985 | Thornley et al. |
| 6,791,488 B2 | 9/2004 | Diekhans et al. |
| 8,843,283 B2 | 9/2014 | Strelioff et al. |
| 9,807,933 B2 | 11/2017 | Boyd et al. |
| 2009/0107094 A1* | 4/2009 | Bich ............... A01D 41/141 56/10.2 E |
| 2018/0332768 A1* | 11/2018 | Isaac ............... A01D 41/06 |

FOREIGN PATENT DOCUMENTS

WO   WO 2018152266   *  8/2018   ........... A01D 41/127

* cited by examiner

*Primary Examiner* — Joan T Goodbody
(74) *Attorney, Agent, or Firm* — Peter K. Zacharias; Rebecca L. Henkel; Rickard K. DeMille

(57) ABSTRACT

A calibration system for an agricultural header includes a controller having a memory and a processor. The processor is configured to receive a first position signal indicative of a first position of a reel arm of the agricultural header, receive a first distance signal indicative of a first distance between the reel arm and a terrain feature, receive a second position signal indicative of a second position of the reel arm, receive a second distance signal indicative of a second distance between the reel arm and the terrain feature, determine a calibration curve having a plurality of offset distances of the reel arm based on the first position, the first distance, the second position, and the second distance, and select an offset distance of the plurality of offset distances based on an operational position of the reel arm and the calibration curve.

20 Claims, 7 Drawing Sheets

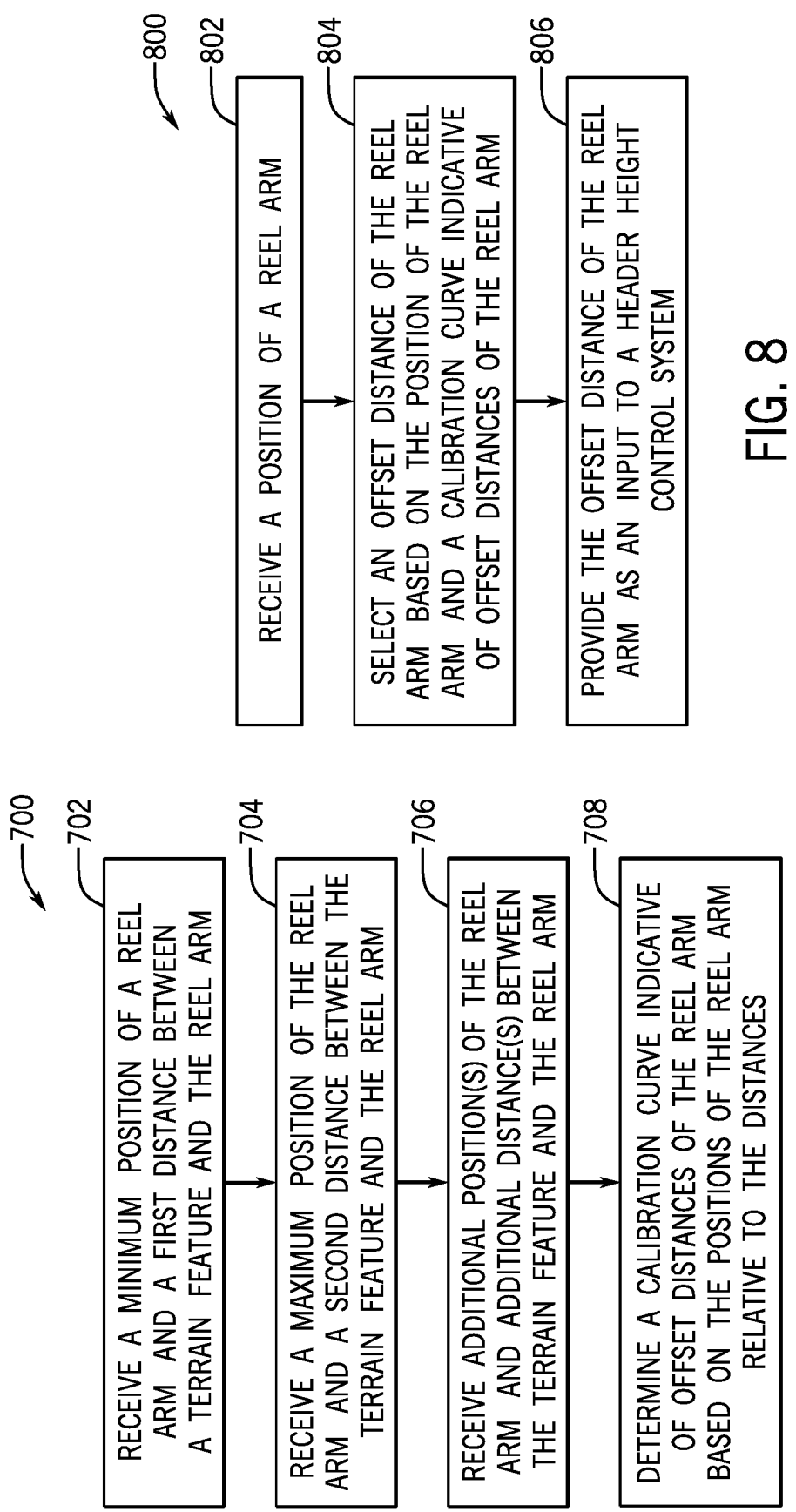

CALIBRATION SYSTEM FOR AN AGRICULTURAL HEADER

BACKGROUND

The present disclosure relates generally to a calibration system for an agricultural header.

A harvester may be used to harvest crops, such as barley, beans, beets, carrots, corn, cotton, flax, oats, potatoes, rye, soybeans, wheat, or other plant crops. During operation of the harvester, the harvesting process may begin by removing a portion of a plant from a field using a header of the harvester. The header may cut the plant and transport the cut crops to a processing system of the harvester.

Certain headers include a cutter bar assembly configured to cut a portion of each crop (e.g., a stalk), thereby separating the cut crop from the soil. The cutter bar assembly may extend along a substantial portion of the width of the header at a forward end of the header. The header may also include one or more belts positioned behind the cutter bar assembly relative to the direction of travel of the harvester. The belt(s) are configured to transport the cut crops to an inlet of the processing system.

Certain headers may also include a reel assembly, which may include a reel having multiple fingers extending from a central framework. The central framework is driven to rotate, such that the fingers move in a circular pattern. The fingers are configured to engage the crops, thereby preparing the crops to be cut by the cutter bar assembly and/or urging the cut crops to move toward the belt(s). The reel is typically supported by multiple arms extending from a frame of the header. The reel assembly may include one or more actuators configured to drive the arms to rotate, thereby adjusting the position of the reel relative to the frame of the header.

BRIEF DESCRIPTION

In one embodiment, a calibration system for an agricultural header includes a controller having a memory and a processor. The processor is configured to receive a first position signal indicative of a first position of a reel arm of the agricultural header, receive a first distance signal indicative of a first distance between the reel arm and a terrain feature, receive a second position signal indicative of a second position of the reel arm, receive a second distance signal indicative of a second distance between the reel arm and the terrain feature, determine a calibration curve having a plurality of offset distances of the reel arm based on the first position, the first distance, the second position, and the second distance, and select an offset distance of the plurality of offset distances based on an operational position of the reel arm and the calibration curve.

In one embodiment, a method of calibrating a monitoring system of an agricultural header includes receiving a first position of a reel arm of the agricultural header relative to a frame of the agricultural header, receiving a first distance between the reel arm and a terrain feature, receiving a second position of the reel arm of the agricultural header relative to the frame of the agricultural header, and receiving a second distance between the reel arm and the terrain feature. Additionally, the method includes determining a calibration curve indicative of a plurality of offset distances of the reel arm based on the first position of the reel arm, the first distance between the reel arm and the terrain feature, the second position of the reel arm, and the second distance between the reel arm and the terrain feature. Further, the method includes selecting an offset distance of the plurality of offset distances based on an operational position of the reel arm and the calibration curve.

In one embodiment, a non-transitory computer readable storage medium for an agricultural header includes instructions that, when executed by a processor, cause the processor to receive a first position signal indicative of a first position of a reel arm of the agricultural header, receive a first distance signal indicative of a first distance between the reel arm and a terrain feature, receive a second position signal indicative of a second position of the reel arm, and receive a second distance signal indicative of a second distance between the reel arm and the terrain feature. The storage medium also includes instructions that, when executed by the processor, cause the processor to determine a calibration curve indicative of a plurality of offset distances of the reel arm based on the first position of the reel arm, the first distance between the reel arm and the terrain feature, the second position of the reel arm, and the second distance between the reel arm and the terrain feature and select an offset distance of the plurality of offset distances based on an operational position of the reel arm and the calibration curve.

DRAWINGS

These and other features, aspects, and advantages of the present disclosure will become better understood when the following detailed description is read with reference to the accompanying drawings in which like characters represent like parts throughout the drawings, wherein.

FIG. 7 is a flow diagram of an embodiment of a method of determining a calibration curve using a calibration system for an agricultural header, in accordance with embodiments of the present disclosure; and FIG. 8 is a flow diagram of an embodiment of a method of selecting an offset distance of a reel arm of an agricultural header based on a calibration curve and an operational position of the reel arm, in accordance with embodiments of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
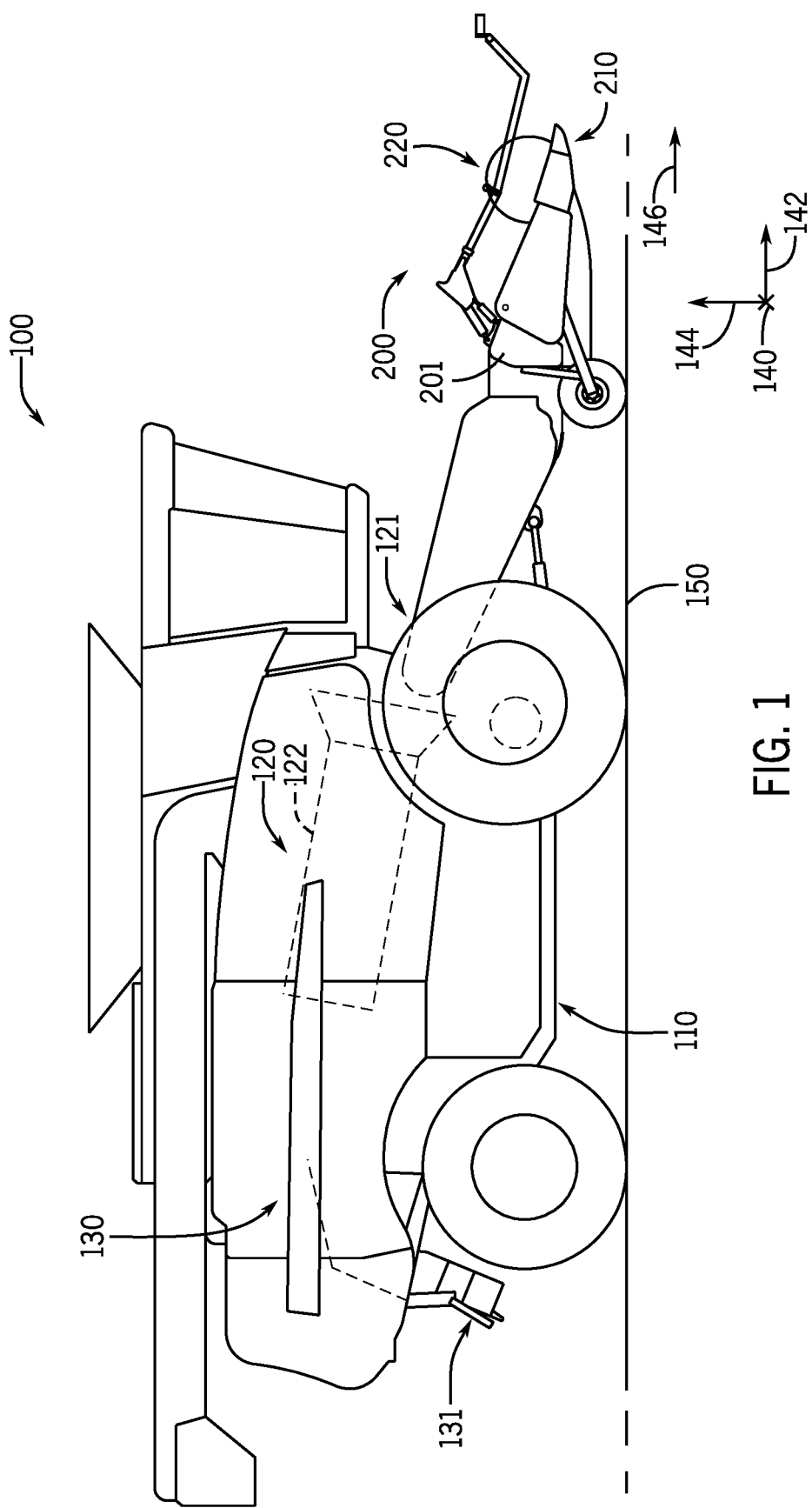
FIG. 1 is a side view of an embodiment of a harvester, in accordance with embodiments of the present disclosure.

Turning to the drawings, FIG. 1 is a side view of an embodiment of a harvester 100 (e.g., agricultural harvester) having a header 200 (e.g., agricultural header). The harvester 100 includes a chassis 110 configured to support the header 200 and an agricultural crop processing system 120. As described in greater detail below, the header 200 is configured to cut crops and to transport the cut crops toward an inlet 121 of the agricultural crop processing system 120 for further processing of the cut crops. The agricultural crop processing system 120 receives cut crops from the header 200 and separates desired crop material from crop residue. For example, the agricultural crop processing system 120 may include a thresher 122 having a cylindrical threshing rotor that transports the crops in a helical flow path through the harvester 100. In addition to transporting the crops, the thresher 122 may separate certain desired crop material (e.g., grain) from the crop residue (e.g., husks and pods) and may enable the desired crop material to flow into a cleaning system located beneath the thresher 122. The cleaning system may remove debris from the desired crop material and transport the desired crop material to a storage compartment within the harvester 100. The crop residue may be transported from the thresher 122 to a crop residue handling system 130, which may remove the crop residue from the harvester 100 via a crop residue spreading system 131 positioned at the aft end of the harvester 100. To facilitate discussion, the harvester 100 and/or its components may be described with reference to a lateral axis or direction 140, a longitudinal axis or direction 142, and a vertical axis or direction 144. The harvester 100 and/or its components may also be described with reference to a direction of travel 146.

As discussed in detail below, the header 200 includes a cutter bar assembly 210 configured to cut the crops within the field. The header 200 also includes a reel assembly 220 configured to engage the crops to prepare the crops to be cut by the cutter bar assembly 210 and/or to urge crops cut by the cutter bar assembly 210 onto belts that convey the cut crops toward the inlet 121 of the agricultural crop processing system 120. As discussed in detail below, the reel assembly 220 includes a reel having multiple fingers extending from a central framework. The central framework is driven to rotate, such that the fingers engage the crops and urge the crops toward the cutter bar assembly 210 and the belts. Additionally, the reel may be supported by multiple arms (e.g., reel arms) that are coupled to a frame 201 of the header 200. Each arm of the multiple arms may be coupled to the frame 201 via a respective pivot joint. For example, one pivot joint is configured to enable a first arm of the multiple arms to pivot (e.g., about the lateral axis 140) relative to the frame 201 of to the header 200, and another pivot joint is configured to enable a second arm of the multiple arms to pivot (e.g., about the lateral axis 140) relative to the frame 201 of the header 200.

The reel assembly 220 may include a device configured to facilitate detection of terrain features (e.g., a ground 150) as the harvester 100 travels through the field. For example, the device may be a sensor that is configured to detect the terrain features and to send a signal indicative of the terrain features to an electronic controller for processing. In some embodiments, the reel assembly 220 may include any number of devices (e.g., 1, 2, 3, 4, 5 or more) and any of a variety of devices, such as any of a variety of devices that emit electromagnetic waves (e.g., sensors), coupled to the device mounting structure.

As described above, the arm of the reel assembly 220 may pivot (e.g., rotate) relative to a frame of the header 200. As such, the device coupled to the arm may move generally vertically relative to the ground 150 on which the header 200 and the harvester 100 are disposed. The device may monitor the terrain features at different/varying positions relative to ground 150. For example, the device may detect a distance between the arm of the reel assembly 220 and the terrain feature of the ground 150 at the different positions of the arm relative to the ground 150. Movement (e.g., pivoting) of the arm relative to the frame of the header 200 may affect (e.g., increase or decrease) the distance between the arm of the reel assembly 220 and the terrain feature, as detected by the device.

In the disclosed embodiments, an agricultural system (e.g., the header 200 and/or the harvester 100), may include a calibration system configured to compensate for movement of the arm of the reel assembly 220 relative to the frame of the header 200. For example, the device may detect the distance between the arm and the terrain feature of the ground 150 at different positions of the arm, and the calibration system may determine a calibration curve based on the positions of the arm and the detected distances between the arm and the terrain feature. In the disclosed embodiments, the calibration system, and/or a controller of the agricultural system, may select an offset distance of the arm based on the calibration curve and a position of the arm during operation of the header 200 (e.g., an operational position). The offset distance may be provided as an input to a header height control system configured to adjust a height of the header 200 relative to the ground 150 (e.g., a distance between the header 200 and the ground 150 along the vertical axis 144). Accordingly, the calibration system disclosed herein may enable the header height control system to control the height of the header 200 based on the distance between the arm and the ground 150, as detected by the device, and by compensating for movement of the arm of the reel assembly 220 relative to the frame of the header 200.

The calibration curve for the header 200 may be determined periodically (e.g., once per year, once per month, once per day, once per harvesting season), after or in response to maintenance and/or repair of the harvester 100, prior to entering a field, after transitioning from a roadway to a field, or at other suitable times. Additionally, an operator, a dealer, and/or a manufacturer may control the calibration system of the header 200 to determine the calibration curve (e.g., provide an operator input to cause the calibration system to determine the calibration curve).

Figure 2:
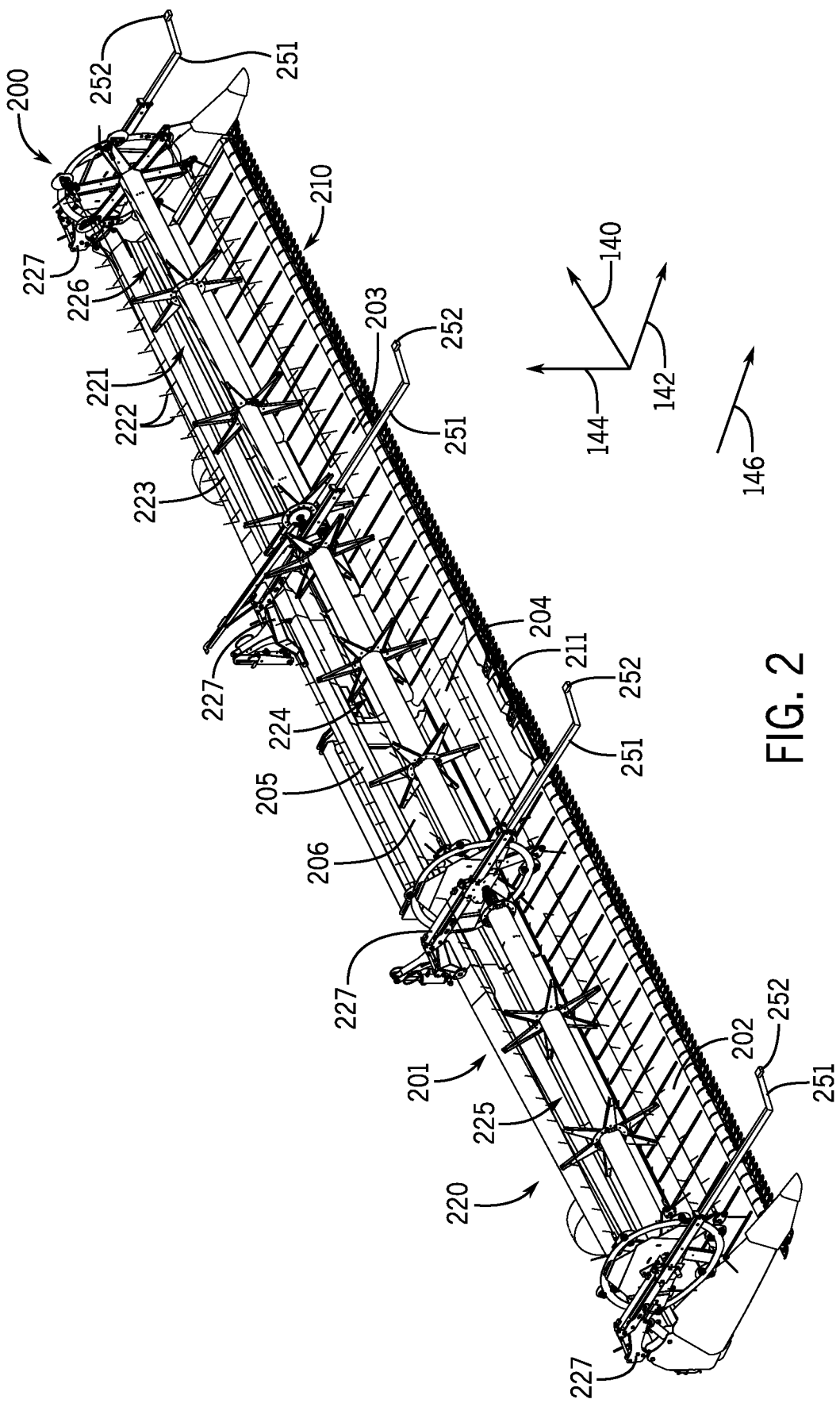
FIG. 2 is a perspective view of an embodiment of a header that may be employed within the harvester of FIG. 1, in accordance with embodiments of the present disclosure.

FIG. 2 is a perspective view of an embodiment of the header 200 that may be employed within the harvester 100 of FIG. 1. In the illustrated embodiment, the header 200 includes the cutter bar assembly 210 configured to cut a portion of each crop (e.g., a stalk), thereby separating the crop from the soil. The cutter bar assembly 210 is positioned at a forward end of the header 200 relative to the longitudinal axis 142 of the header 200. As illustrated, the cutter bar assembly 210 extends along a substantial portion of the width of the header 200 (e.g., the extent of the header 200 along the lateral axis 140). The cutter bar assembly 210 includes a blade support, a stationary guard assembly, and a moving blade assembly. The moving blade assembly is fixed to the blade support (e.g., above the blade support along the vertical axis 144 of the header 200), and the blade support/moving blade assembly is driven to oscillate relative to the stationary guard assembly. In the illustrated embodiment, the blade support/moving blade assembly is driven to oscillate by a driving mechanism 211 positioned at the lateral center of the header 200. However, in other embodiments, the blade support/moving blade assembly may be driven by another suitable mechanism (e.g., located at any suitable position on the header 200). As the harvester 100 is driven through the field, the cutter bar assembly 210 engages crops within the field, and the moving blade assembly cuts the crops (e.g., the stalks of the crops) in response to engagement of the cutter bar assembly 210 with the crops.

In the illustrated embodiment, the header 200 includes a first lateral belt 202 on a first lateral side of the header 200 and a second lateral belt 203 on a second lateral side of the header 200, opposite the first lateral side. Each belt is driven to rotate by a suitable drive mechanism, such as an electric motor or a hydraulic motor. The first lateral belt 202 and the second lateral belt 203 are driven such that the top surface of each belt moves laterally inward. In addition, the header 200 includes a longitudinal belt 204 positioned between the first lateral belt 202 and the second lateral belt 203 along the lateral axis 140. The longitudinal belt 204 is driven to rotate by a suitable drive mechanism, such as an electric motor or a hydraulic motor. The longitudinal belt 204 is driven such that the top surface of the longitudinal belt 204 moves rearwardly relative to the direction of travel 146.

In the illustrated embodiment, the crops cut by the cutter bar assembly 210 are directed toward the belts at least in part by the reel assembly 220, thereby substantially reducing the possibility of the cut crops falling onto the surface of the field. The reel assembly 220 includes a reel 221 having multiple fingers 222 extending from a central framework 223. The central framework 223 is driven to rotate such that the fingers 222 move (e.g., in a circular pattern). The fingers 222 are configured to engage the crops and urge the cut crops toward the belts. The cut crops that contact the top surface of the lateral belts 202, 203 are driven laterally inwardly to the longitudinal belt 204 due to the movement of the lateral belts 202, 203. In addition, cut crops that contact the longitudinal belt 204 and the cut crops provided to the longitudinal belt 204 by the lateral belts 202, 203 are driven rearwardly relative to the direction of travel 146 due to the movement of the longitudinal belt 204. Accordingly, the belts move the cut agricultural crops through an opening 206 in the header 200 to the inlet 121 of the agricultural crop processing system 120 (FIG. 1).

In the illustrated embodiment, the reel 221 includes multiple sections coupled to one another. In particular, the reel 221 includes a center section 224 (e.g., positioned forward of a center section 205 of the frame 201 of the header 200 relative to the direction of travel 146), a first wing section 225, and a second wing section 226. In the illustrated embodiment, each section of the reel 221 is supported by one or more arms 227 (e.g., reel arms) that are coupled to the frame 201 of the header 200. While the reel 221 includes three sections 224, 225, 226 coupled to the frame 201 of the header 200 via four arms 227, it should be appreciated that the reel 221 may include any number of sections coupled to the frame 201 of the header 200 via any number of arms (e.g., one section coupled to the frame 201 of the header 200 via two arms; two sections coupled to the frame 201 of the header 200 via three arms; four sections coupled to the frame 201 of the header 200 via five arms).

As discussed in detail below, regardless of the number of arms 227, each arm 227 is pivotally coupled to the frame 201 of the header 200 via a respective pivot joint. The pivot joints are configured to enable the arms 227 to pivot (e.g., about the lateral axis 140) relative to the frame 201 of the header 200. An actuator may be coupled to each arm 227 and configured to drive the respective arm 227 to rotate, thereby controlling a position of the reel 221 relative to the frame 201 of the header 200 along the vertical axis 144. Such a configuration may enable the reel 221 to be positioned at an appropriate position along the vertical axis 144 to engage the crops to prepare the crops to be cut by the cutter bar assembly 210 and/or to urge the cut crops toward the belts 202, 203, 204, for example. In some embodiments, each section of the reel 221 may also be configured to slide along its respective arm(s) to enable the reel 221 to move along the longitudinal axis 142 relative to the frame 201 of the header 200. Such a configuration may enable at least a portion of the reel assembly 220 to be positioned forward of the cutter bar assembly 210 relative to the direction of travel 146 to enable the reel assembly 220 to engage the crop to prepare the crop to be cut by the cutter bar assembly 210, for example.

As noted above, the reel assembly 220 may include one or more devices 252 (e.g., sensors) configured to facilitate detection of terrain features, such as a distance to the ground 150, as the harvester 100 travels through the field. Additionally, the reel assembly 220 may include one or more support structures 251 (e.g., brackets, reel arm extensions) coupled to and configured to support the devices 252. In the illustrated embodiment, each of the arms 227 is coupled to a respective support structure 251 that supports a respective device 252. However, only some of the arms 227 may be coupled to a respective support structure 251 that supports a respective device 252. For example, only the laterally-outer arms 227 may be coupled to a respective support structure 251 and a respective device 252, only the laterally-inner arm(s) 227 may be coupled to a respective support structure 251 and a respective device 252, and/or every other arm 227 (e.g., non-adjacent or alternating arms) may be coupled to a respective support structure 251 and a respective device 252.

As discussed in more detail below, regardless of the number of support structures 251 and devices 252 included in the reel assembly, the header 200 and/or the harvester 100 may include a calibration system configured to compensate for movement of the arm 227 relative to the frame 201 of the header 200. For example, the device may detect a distance between the arm 227 and the terrain feature of the ground 150 at different positions of the arm 227 relative to the frame 201, and the calibration system may determine a calibration curve based on the positions of the arm 227 and the detected distances between the arm 227 and the terrain feature. Thereafter, the calibration curve and an operational position of the arm 227 may be used to select an offset distance of the arm 227. The offset distance may be provided as an input to a header height control system configured to adjust a height of the header 200 relative to the ground 150 (e.g., generally along the vertical axis 144), thereby compensating for movement of the arm 227 while controlling the height of the header 200.

Figure 3:
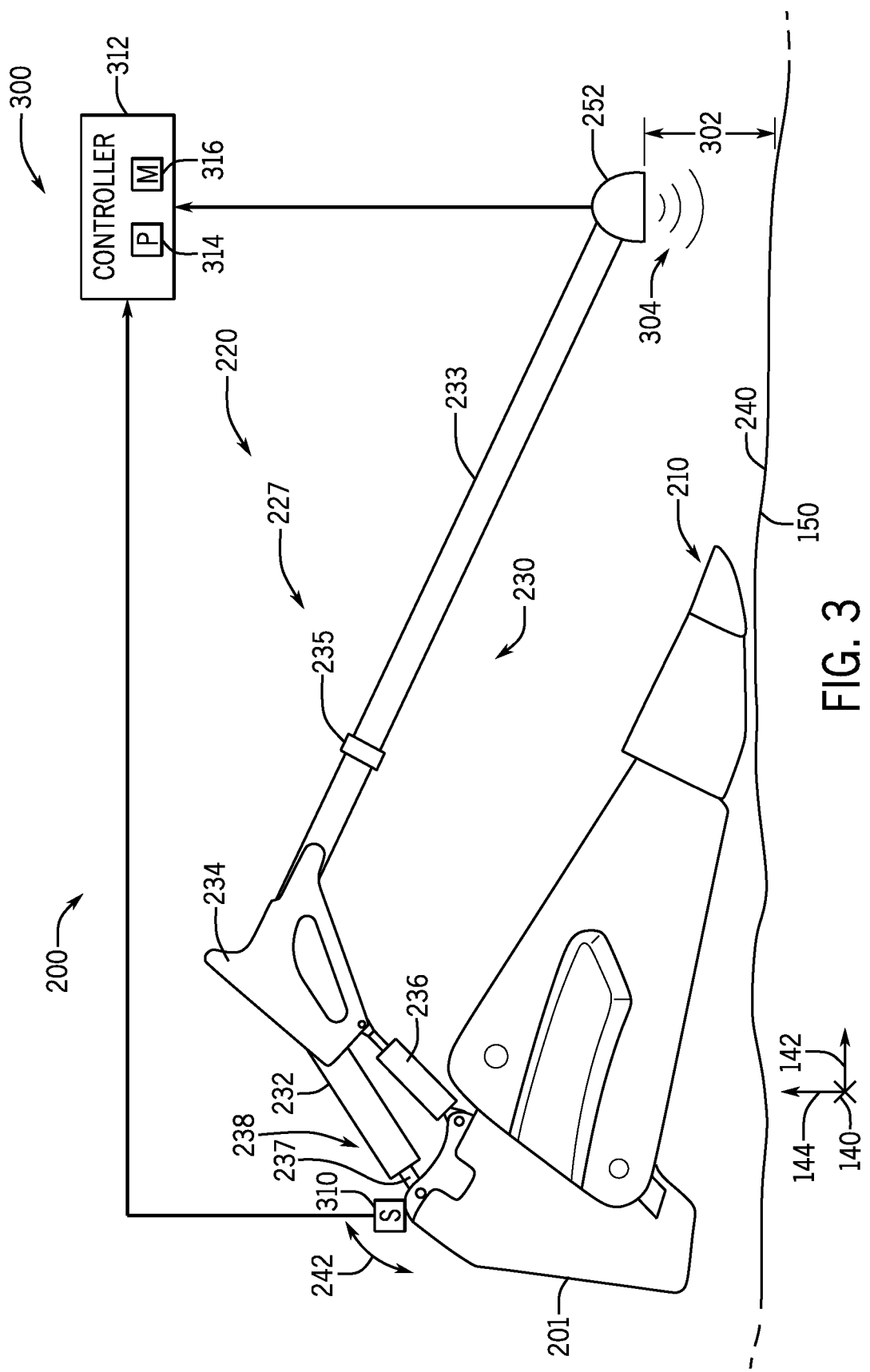
FIG. 3 is a side view of an embodiment of a portion of the header of FIG. 2, in which a reel arm having a device is in a first position relative to a frame of the header, in accordance with embodiments of the present disclosure.
Figure 4:
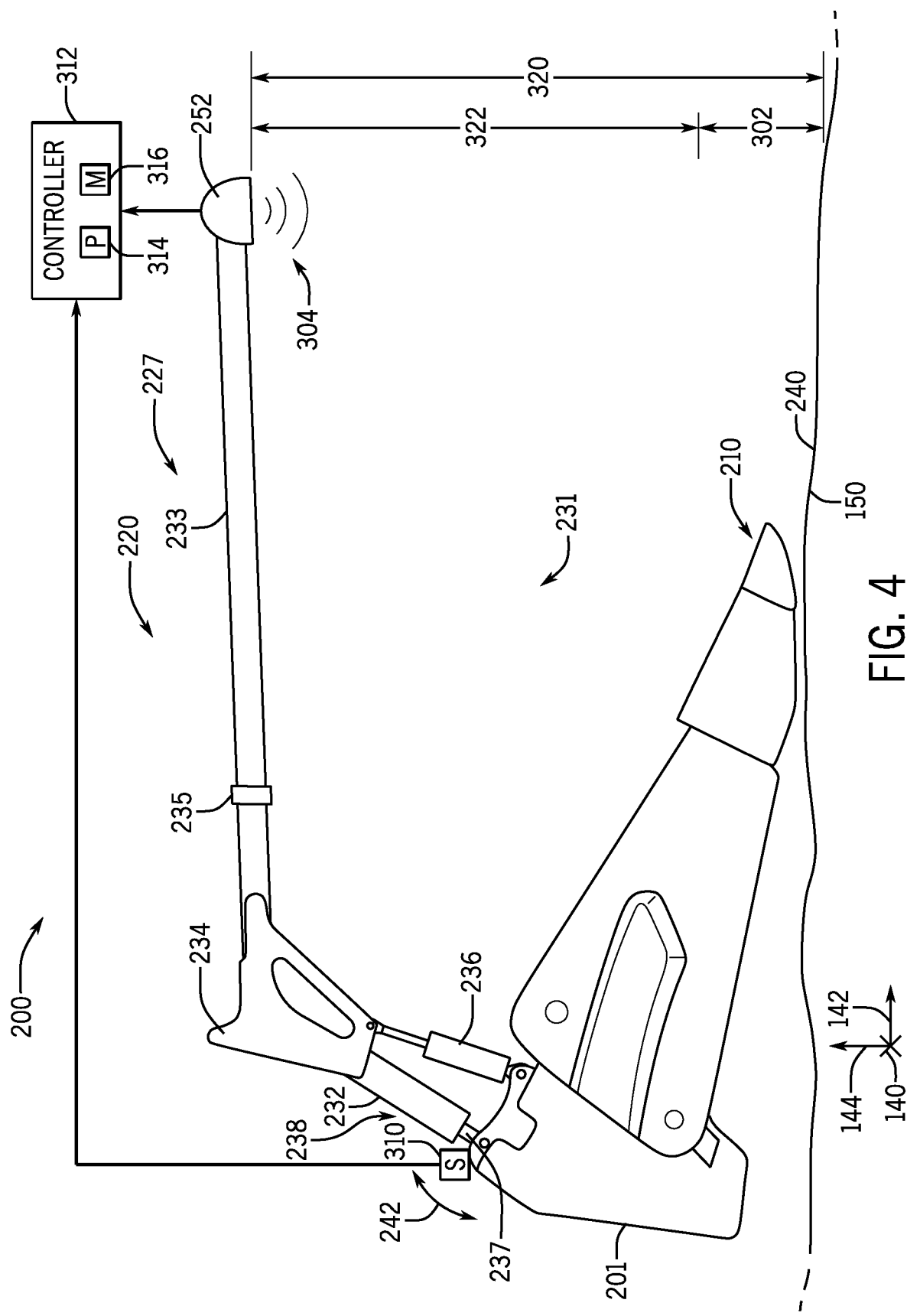
FIG. 4 is a side view of the portion of the header of FIG. 3, in which the reel arm having the device is in a second position relative to the frame of the header, in accordance with embodiments of the present disclosure.

FIG. 3 is a side view of a portion of the header 200 with the arm 227 in a first position 230 relative to the frame 201 of the header 200, and FIG. 4 is a side view of the portion of the header 200 with the arm 227 in a second position 231 relative to the frame 201 of the header 200. The arm 227 includes a first arm portion 232 and a second arm portion 233 that are coupled together (e.g., in a fixed position relative to one another). In the illustrated embodiment, the first arm portion 232 and the second arm portion 233 are coupled together another via one or more plates 234 (e.g., on opposite lateral sides of the arm portions 232, 233), although the first arm portion 232 and the second arm portion 233 may be coupled together via any suitable fasteners (e.g., bolts, pins, welds). In certain embodiments, the first position 230 may be a lowest position (e.g., a minimum position) of the arm 227 along the vertical axis 144 that the header 200 may achieve, and/or the second position 231 may be a highest position (e.g., a maximum position) of the arm 227 along the vertical axis 144 that the header 200 may achieve. For example, the first position 230 may be a lowermost position of the arm 227 during operation (e.g., a field/harvesting operation) and/or transport of the header 200, and/or the second position 231 may be an uppermost position of the arm 227 during operation (e.g., a field/harvesting operation) and/or transport of the header 200.

It should be appreciated that the arm 227 may have any of a variety of shapes or configurations. For example, the first arm portion 232 and the second arm portion 233 may be physically separate structures that are coupled together, or the first arm portion 232 and the second arm portion 233 may be formed as a one-piece structure. Furthermore, the arm 227 may be formed from any number of portions (e.g., 1, 2, 3, 4, 5, or more) having any of a variety of dimensions (e.g., lengths). Moreover, the arm 227 may have any number (e.g., 1, 2, 3, 4, 5, or more) of bends and/or the arm portions may be positioned at any of a variety of angles relative to one another. The reel 221 (FIG. 2) may be coupled to the arm 227 via a slide 235 (e.g., carriage) that enables the reel 221 to slide along the second arm portion 233 to move along the longitudinal axis 142 relative to the frame 201 of the header 200. To facilitate discussion and for image clarity, the reel 221 and the other associated components that couple the reel 221 to the arm 227 are omitted in FIGS. 3 and 4.

The header 200 includes an actuator 236 that may be controlled (e.g., via an electronic controller and/or manually via an operator) to adjust the arm 227 between the first position 230 and the second position 231. As shown, the actuator 236 extends between the frame 201 of the header 200 and the one or more plates 234, although the actuator 236 may be positioned at any suitable location and may be coupled to any suitable structures (e.g., the first arm portion 232, the second arm portion 233) to drive the arm 227 between the first position 230 and the second position 231. An end 237 (e.g., proximal end) of the arm 227 is also pivotally coupled to the frame 201 of the header 200 via a pivot joint 238 (e.g., arm-to-frame pivot joint). The arm 227 is configured to rotate relative to the frame 201 at the pivot joint 238, as indicated by arrows 242.

As described above, a calibration system 300 is configured to compensate for movement of the arm 227 relative to the frame 201 of the header 200 (e.g., about the pivot joint 238). For example, the calibration system 300 includes the device 252 configured to detect a first distance 302 (e.g., a compensated distance, a baseline distance, a minimum distance) between the arm 227 (e.g., the second arm portion 233) and a surface 240 of the ground 150 while the arm 227 is in the first position 230. In certain embodiments, the device 252 may be a sensor configured to emit electromagnetic waves 304 to detect terrain feature(s) of the surface 240 and the ground 150. In some embodiments, the device may include an ultrasonic sensor configured to emit sound waves, a Radio Detection and Ranging (radar) sensor, a Light Detecting and Ranging (lidar) sensor, an ultraviolet sensor configured to emit ultraviolet light, an infrared sensor configured to emit infrared light, and/or a camera sensor.

Additionally, the calibration system 300 includes a device 310 (e.g., a reel sensor) configured to detect a position (e.g., a rotational position including the first position 230 and the second position 231) of the arm 227 relative to the frame 201, such as at the pivot joint 238. For example, the device 310 may be a position sensor configured to detect the position of the arm 227, such as based on an amount of an output voltage. In other embodiments, the device 310 may be another suitable sensor configured to detect the position of the arm 227 relative to the frame 201.

As shown, the calibration system 300 includes a controller 312 having a processor 314 and a memory 316. The controller 312 is configured to receive signals from the device 252, such as distance signals indicative of distances between the arm 227 and the ground 150. For example, the controller 312 may receive a first distance signal from the device 252 indicative of the first distance 302 of FIG. 3 and a second distance signal from the device 252 indicative of a second distance 320 of FIG. 4 (e.g., a second distance between the arm 227 and the ground 150 while the arm 227 is disposed in the second position 231). Additionally, the controller 312 is configured to receive position signals from the device 310, such as position signals indicative of positions of the arm 227 relative to the frame 201 of the header 200. For example, the controller 312 may receive a first position signal from the device 310 indicative of the first position 230 of the arm 227 of FIG. 3 and a second position signal from the device 310 indicative of the second position 231 of the arm 227 of FIG. 4.

As described in greater detail below in reference to FIG. 5, the controller 312 may receive additional signals from the device 252 indicative of additional distance(s) between the arm 227 and the ground 150, such as additional distances greater than the first distance 302 of FIG. 3 and less than the second distance 320 of FIG. 4. Additionally, the controller 312 may receive additional signals from the device 310 indicative of additional position(s) of the arm 227 relative to the frame 201, such as additional rotational positions between the first position 230 and the second position 231. Each additional position of the arm 227 may correspond to an additional distance between the arm 227 and the ground 150. In certain embodiments, the controller 312 may be communicatively coupled to and configured to control the actuator 236 to drive rotation of the arm 227, such as to the first position 230, the second position 231, and positions between the first position 230 and the second position 231 to facilitate collection of data (e.g., the additional distances).

Based on the detected positions of the arm 227 relative to the frame 201, including the first position 230, the second position 231, additional detected position(s), or a combination thereof, and detected distances between the arm 227 and the ground 150, such as the first distance 302, the second distance 320, additional detected distance(s), or a combination thereof, the controller 312 may determine or generate a calibration curve including offset distances of the arm 227.

Each offset distance may be a distance to be subtracted from a measured distance detected by the device 252.

By way of example, in FIG. 4, the header 200 may be operating with the arm 227 in the second position 231. The device 310 may detect that the arm 227 is disposed at the second position 231. Based on the arm 227 being disposed at the second position 231 and by referencing the calibration curve, the controller 312 may select an offset distance 322. As illustrated, the offset distance 322 is a difference between the second distance 320 and the first distance 302. Accordingly, the offset distance 322 may account for movement of the arm 227 from the first position 230 to the second position 231 to enable the measured distance (e.g., the second distance 320) to be used as an input for controlling the height of the header 200 relative to the ground 150. As may be appreciated, the offset distance 322 selected by the controller 312 may change as the arm 227 changes position (e.g., rotates) relative to the frame 201.

The processor 314 (e.g., a microprocessor) may be used to execute software, such as software stored in the memory 316 for controlling the calibration system 300 (e.g., for determining the calibration curve and/or for selecting the offset distance 322). Moreover, the processor 314 may include multiple microprocessors, one or more "general-purpose" microprocessors, one or more special-purpose microprocessors, and/or one or more application specific integrated circuits (ASICS), or some combination thereof. For example, the processor 314 may include one or more reduced instruction set (RISC) or complex instruction set (CISC) processors.

The memory device 316 may include a volatile memory, such as random access memory (RAM), and/or a nonvolatile memory, such as read-only memory (ROM). The memory device 316 may store a variety of information and may be used for various purposes. For example, the memory device 316 may store processor-executable instructions (e.g., firmware or software) for the processor 314 to execute, such as instructions for controlling the calibration system 300. In certain embodiments, the controller 312 may also include one or more storage devices and/or other suitable components. The storage device(s) (e.g., nonvolatile storage) may include ROM, flash memory, a hard drive, or any other suitable optical, magnetic, or solid-state storage medium, or a combination thereof. The storage device(s) may store data (e.g., the calibration curve), instructions (e.g., software or firmware for controlling the calibration system 300), and any other suitable data. The processor 314 and/or the memory device 316, and/or an additional processor and/or memory device, may be located in any suitable portion of the system. For example, a memory device for storing instructions (e.g., software or firmware for controlling portions of the calibration system 300) may be located in or associated with the calibration system 300. The processor 314 may be any suitable type of computer processor or microprocessor capable of executing computer-executable code. The processor 314 may also include multiple processors that may perform the operations described herein. The memory 316 may represent non-transitory computer-readable media (e.g., any suitable form of memory or storage) that may store the processor-executable code used by the processor 314 to perform various techniques described herein. It should be noted that non-transitory merely indicates that the media is tangible and not a signal.

It should also be appreciated that any of the devices disclosed herein (e.g., the device 252, the device 310, and any other device) may include a power source (e.g., battery) and/or may be coupled to a power source (e.g., via a power cable). Furthermore, the controller 312 may control operation of the device(s) and/or process signals received from the devices. For example, the controller 312 may control operation of the devices and may also receive signals from the devices. The controller 312 may process the signals to determine the terrain features, including the distance to the ground 150, and then may provide control signals to adjust the header 200 to an appropriate position (e.g., vertical position) based on the terrain features (e.g., header height control), for example.

In some embodiments, the calibration system 300 may include a user interface communicatively coupled to the controller 312. The user interface may be configured to inform an operator of the position of the arm 227, the selected offset distance 322, to enable the operator to initiate a process (e.g., method 700 of FIG. 7) of determining the calibration curve and/or selecting the offset distance 322, and to enable other operator interactions. For example, the user interface may include a display and/or other user interaction devices (e.g., buttons) configured to enable operator interactions.

Figure 5:
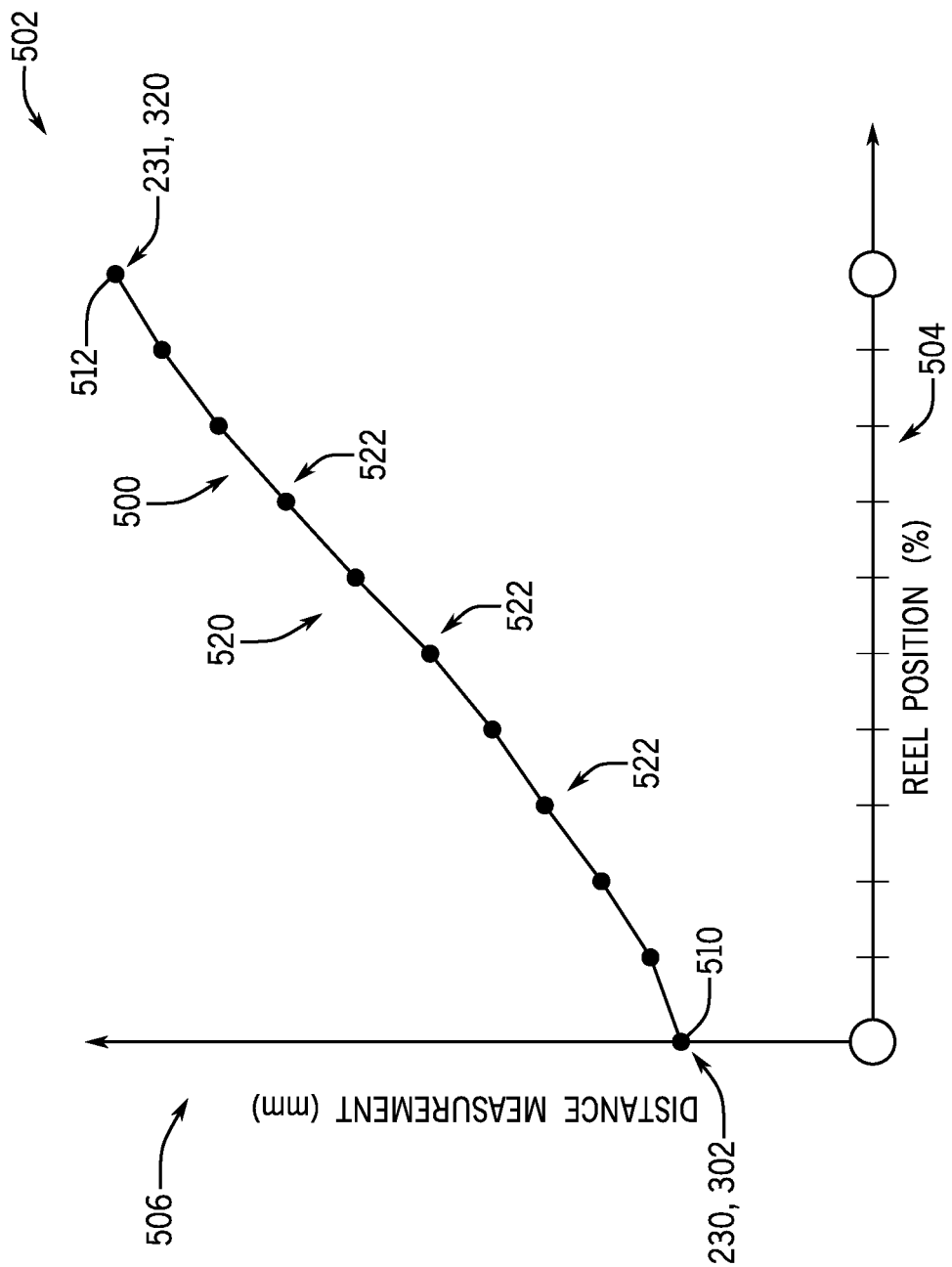
FIG. 5 is an embodiment of a calibration curve that may be determined by a calibration system based on the first position of the reel arm of FIG. 3 and the second position of the reel arm of FIG. 4, in accordance with embodiments of the present disclosure.

FIG. 5 is an embodiment of a calibration curve 500 that may be determined by the calibration system 300 of FIGS. 3 and 4 to facilitate controlling a height of the header 200 based on the distance between the arm 227 and the ground 150 (e.g., as detected by the device 252). The controller 312 may determine the calibration curve 500 based on the first position 230 of the arm 227 of FIG. 3, the first distance 302 of FIG. 3, the second position 231 of the arm 227 of FIG. 4, the second distance 320 of FIG. 4, and additional positions of the arm 227 relative to the frame 201 and corresponding distances between the arm 227 and the ground 150.

For example, the calibration curve 500 is plotted along a graph 502 having an x-axis 504 identified as a reel position axis and a y-axis 506 identified as a distance measurement. A first data point 510 at a first end of the calibration curve 500 represents the first position 230 of the arm 227 relative to the frame 201 and the first distance 302 between the arm 227 and the ground 150. A second data point 512 at a second end of calibration curve 500 (e.g., opposite of the first end having the first data point 510) represents the second position 231 and the second distance 320. As such, the calibration curve 500 extends along the x-axis 504 from the first data point 510 representing the minimum position 230 to the second data point 512 representing the maximum position 231. Additionally, the calibration curve 500 extends along the y-axis 506 from the first data point 510 representing the minimum distance 302 to the second data point 512 representing the maximum distance 320.

In certain embodiments, the calibration curve 500 may be a straight line extending between the first data point 510 and the second data point 512. To enhance an accuracy of the offset distance 322 selected by the controller 312 during operation of the header 200 (e.g., during harvesting operations), additional data points 522 may be plotted on the graph 502 along a middle portion 520 between the first data point 510 and the second data point 512, such that the calibration curve 500 is connected to or adjusted based on each additional data point 522. The additional data points 522 may be obtained by the calibration system 300 by incrementally moving the arm 227 from the first position 230 to the second position 231, or vice versa. For example, the controller 312 or another controller of the header 200 may control the actuator 236 configured to drive rotation of the arm 227 to move incrementally from the first position 230 to the second position 231. At each increment, the controller 312 may receive a distance signal from the device 310 indicative of the distance between the arm 227 and the terrain feature of the ground 150 (e.g., the same terrain feature detected at FIG. 3 to determine the distance 302 and at FIG. 4 to determine the distance 320). Each additional data point 522 is plotted along the x-axis 504 at the detected/controlled position and along the y-axis 506 at the detected distance. Thereafter, the calibration curve 500 is determined or adjusted, such that the calibration curve 500 intersects the first data point 510, each additional data point 522, and the second data point 512, thereby forming a piecewise linear function. In certain embodiments, the calibration curve 500 may be a best fit line extending generally along the first data point 510, the additional data points 522, and the second data point 512 or another suitable line/curve.

As illustrated, the x-axis 504 may include percentage increments, such that the first position 230 corresponds to a position of the arm 227 at 0 percent and the second position 231 corresponds to a position of the arm 227 at 100 percent. Each additional data point 522 is measured at increments of 10 percent (e.g., 20 percent, 30 percent). In certain embodiments, other percentage increments may be used, such as 20 percent, 5 percent, 1 percent, or the increments may be an angular rotation measurement of the arm 227 relative to the frame (e.g., 1 degree, 2 degrees, 5 degrees). As illustrated, the y-axis 506 is illustrated in millimeter units. In certain embodiments, the y-axis 506 may be in centimeters, meters, or in imperial units. The calibration curve 500 may be generated while the frame 201 of the header 200 is stationary relative to the ground 150 during a calibration process (e.g., prior to traveling in the direction of travel over the ground 150; prior to harvesting operations).

Figure 6:
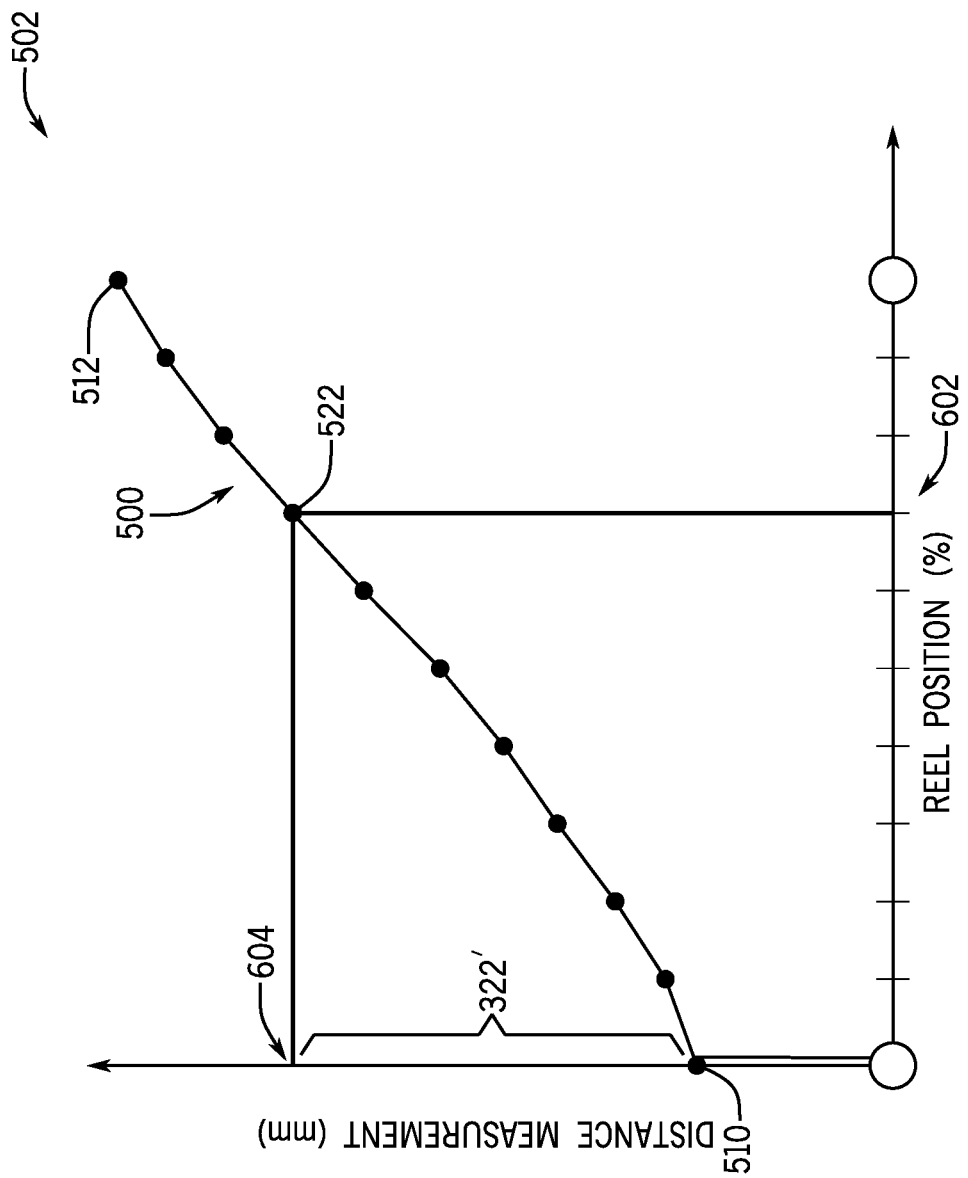
FIG. 6 is an embodiment of an offset distance that may be selected based on the calibration curve of FIG. 5 and an operational position of the reel arm of the header of FIG. 2, in accordance with embodiments of the present disclosure.

FIG. 6 is an embodiment of an offset distance 322' that may be selected by the controller 312 based on the calibration curve 500 of FIG. 5 and an operational position 602 of the arm 227 of the header 200. For example, during operation of the header 200 (e.g., a harvesting operation) and/or during transport of the header 200, the arm 227 may be disposed at the operational position 602 relative to the frame 201 (e.g., at about 60 percent along the x-axis 504). The operational position 602 is disposed along the calibration curve 500 adjacent to one of the additional data points 522 and corresponds to a distance measurement 604 along the y-axis. The distance measurement 604 may represent a distance that would exist between the arm 227 and the ground 150 at the same portion of the ground 150 where the first position 230, the second position 231, the first distance 302, the second distance 320, and additional positions/distances were measured. Accordingly, the offset distance 322' is a difference between the distance measurement 604 and the first position 230 (e.g., the baseline/minimum position). In other words, the offset distance 322' compensates for movement of the arm 227 to the operational position 602 and while the device 252 is detecting the distance between the arm 227 and the ground 150 at the operational position 602. As such, the calibration curve 500 is indicative of offset distances that may be selected based on the operational position of the arm 227. The offset distance 322' may be provided as an input to a control system configured to adjust the height of the header 200 relative to the ground 150, such as the controller 312 or another suitable control system. Thereafter, the control system may adjust the height of the header 200 based on the offset distance 322', among other inputs and/or factors.

FIG. 7 is a flow diagram of an embodiment of a method 700 of determining the calibration curve 500 using the calibration system 300 of the header 200. The method 700, or portions thereof, may be performed by the controller 312 of the calibration system 300. The method 700 begins at block 702, where a minimum position of a reel arm and a first distance between a terrain feature and the reel arm are received. For example, the minimum position of the reel arm may be the first position 230 of the arm 227 relative to the frame 201, and the first distance may be the first distance 302 between the arm 227 and the terrain feature of the ground 150. In certain embodiments, block 702 may be separate steps, in which the minimum position of the reel arm is received as one step and the first distance between the terrain feature and the reel arm is received as another step.

At block 704, a maximum position of the reel arm and a second distance between a terrain feature and the reel arm are received. For example, the maximum position of the reel arm may be the second position 231 of the arm 227 relative to the frame 201, and the second distance may be the second distance 320 between the arm 227 and the terrain feature of the ground 150. In certain embodiments, block 702 may be separate steps, in which the maximum position of the reel arm is received as one step and the second distance between the terrain feature and the reel arm is received as another step.

At block 706, additional position(s) of the reel arm and additional distance(s) between the terrain feature and the reel arm are received. For example, the controller 312 may receive additional position(s) of the arm 227 relative to the frame 201 and additional distance(s) between the arm 227 and the ground 150, such as the positions and distances of the additional data points 522 of FIGS. 5 and 6. Each additional position of the arm 227 may correspond to an additional distance between the arm 227 and the ground 150. In certain embodiments, block 706 may be omitted.

At block 708, a calibration curve indicative of offset distances of the reel arm is determined based on the positions of the reel arm relative to the distances between the reel arm and the terrain feature. For example, as described in reference to FIGS. 5 and 6, the calibration curve 500 may be a piecewise linear function, a best fit line, or another suitable function determined based on the positions of the arm 227 relative to the frame 201 of the header 200 and the corresponding distances between the arm 227 and the ground 150. Points along the calibration curve 500 may correspond to a given operational position of the arm 227 and a distance measurement of the arm 227. The offset distance may be determined based on the distance measurement, such that the calibration curve is indicative of various offset distances of the arm 227. The method 700 may be carried out while the frame 201 of the header 200 is stationary relative to the ground 150 (e.g., prior to traveling in the direction of travel over the ground 150; prior to harvesting operations).

FIG. 8 is a flow diagram of an embodiment of a method 800 of selecting the offset distance 522, 522' of the arm 227 based on the calibration curve 500 and the operational position of the arm 227. The method 800, or portions thereof, may be performed by the controller 312 of the calibration system 300. The method 800 begins at block 802, where a position of a reel arm is received. For example, the controller 312 may receive the operational position 602 of the arm 227.

At block 804, an offset distance of the reel arm is selected based on the position of the reel arm and a calibration curve indicative of offset distances of the reel arm. For example, the controller 312 may select the offset distance by comparing the received operational position of the arm to the calibration curve determined via method 700. In reference to FIG. 6, the offset distance 322' may be selected based on the operational position 602 and the calibration curve 500.

At block 806, the selected offset distance of the reel arm is provided as an input to a control system of the agricultural system, such as a header height control system that is configured to control a position of the header (e.g., a vertical position of the header). The header height control system, such as the controller 312, another controller of the header 200, or a controller of the harvester 100 generally, may control the height of the header 200 (e.g., the frame 201 of the header 200) based on the selected offset distance, such as by raising or lowering the header 200 based on the selected offset distance. The method 800 may be carried out while the frame 201 of the header 200 is travels in the direction of travel over the ground 150 (e.g., during harvesting operations).

Accordingly, the calibration system described herein may facilitate controlling the height of the header based on a distance between a reel arm of the header and a ground on which the header is disposed, as detected by a device (e.g., a sensor) coupled to the reel arm. The calibration system may select an offset distance based on an operational position of the reel arm relative to a frame of the header and use the selected offset distance to control the height of the header. It should be appreciated that the disclosed embodiments may be adapted for use while the device is positioned on any movable portion (e.g., vertically movable portion; movable relative to the frame of the header) of the agricultural system (e.g., to compensate for changes in vertical position of the device relative to the frame of the header). Furthermore, while certain figures illustrate the device maintaining an orientation relative to the frame of the header and/or relative to the ground, it should be appreciated that the device may maintain an orientation relative to the arm 227 or may have any of a variety of other configurations and/or orientations that enable the device to monitor the terrain features as disclosed herein.

While only certain features have been illustrated and described herein, many modifications and changes will occur to those skilled in the art. It is, therefore, to be understood that the appended claims are intended to cover all such modifications and changes as fall within the true spirit of the disclosure. The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A calibration system for an agricultural header, comprising:
a terrain sensor supported on a reel arm that is pivotally coupled to a frame of the agricultural header;
a controller comprising a memory and a processor, wherein the processor is configured to:
receive, from the terrain sensor, a first distance signal indicative of a first distance between the reel arm and a terrain feature while the reel arm is at a first position relative to the frame of the agricultural header;
control a reel actuator to move the reel arm from the first position to a second position relative to the frame of the agricultural header;
receive, from the terrain sensor, a second distance signal indicative of a second distance between the reel arm and the terrain feature while the reel arm is at the second position relative to the frame of the agricultural header;
determine a calibration curve indicative of a plurality of offset distances of the reel arm based on the first position of the reel arm, the first distance between the reel arm and the terrain feature, the second position of the reel arm, and the second distance between the reel arm and the terrain feature; and
select an offset distance of the plurality of offset distances based on an operational position of the reel arm and the calibration curve.

2. The calibration system of claim 1, comprising a reel sensor configured to monitor a position of the reel arm of the agricultural header, wherein the controller is configured to receive a first position signal indicative of the first position and a second position signal indicative of the second position from the reel sensor.

3. The calibration system of claim 1, wherein the terrain sensor is configured to emit infrared light, ultraviolet light, sound waves, or a combination thereof, to monitor the terrain feature.

4. The calibration system of claim 1, wherein the terrain sensor is configured to detect the terrain feature forward of a cutter bar assembly of the agricultural header.

5. The calibration system of claim 1, wherein the processor is configured to:
control the reel actuator to move the reel arm to one or more additional positions relative to the frame of the agricultural header;
receive, from the terrain sensor, one or more additional distance signals, wherein each distance signal of the one or more additional distance signals is indicative of a respective additional distance between the reel arm and the terrain feature while the reel arm is at a respective position of the one or more additional positions; and
determine the calibration curve indicative of the plurality of offset distances of the reel arm based on the first position of the reel arm, the first distance between the reel arm and the terrain feature, the second position of the reel arm, the second distance between the reel arm and the terrain feature, the one or more additional positions of the reel arm, and each additional distance between the reel arm and the terrain feature.

6. The calibration system of claim 5, wherein the first distance between the reel arm and the terrain feature comprises a minimum distance between the reel arm and the terrain feature, the second distance comprises a maximum distance between the reel arm and the terrain feature, and each additional distance is between the minimum distance and the maximum distance.

7. The calibration system of claim 1, comprising a reel configured to rotate relative to the reel arm and to slide along the reel arm to facilitate directing crops toward a cutter bar assembly of the agricultural header, wherein the terrain sensor is supported on the reel arm forward of the reel relative to a direction of travel of the agricultural header.

8. The calibration system of claim 1, wherein the processor is configured to initiate a process to receive the first distance, control the reel actuator, and receive the second distance to determine the calibration curve in response to an operator input.

9. The calibration system of claim 1, wherein the processor is configured to determine the calibration curve by generating a line that extends between a first data point and a second data point, wherein the first data point corresponds to the first distance and the first position, and the second data point corresponds to the second distance and the second position.

10. The calibration system of claim 1, wherein the processor is configured to:
control the reel actuator to incrementally move the reel arm to a plurality of additional positions between the first position and the second position;
receive, from the terrain sensor, a plurality of additional distance signals, wherein each distance signal of the plurality of additional distance signals is indicative of a respective additional distance between the reel arm and the terrain feature while the reel arm is at a respective position of the plurality of additional positions; and
determine the calibration curve as a best fit line or a piecewise linear function across a plurality of data points, wherein the plurality of data points comprise a first data point that corresponds to the first distance and the first position, a second data point that corresponds to the second distance and the second position, and a plurality of additional data points that each correspond to a respective additional distance and a respective position of the plurality of additional positions.

11. A method of calibrating a monitoring system of an agricultural header, comprising:
receiving, from a reel sensor, a first position of a reel arm of the agricultural header relative to a frame of the agricultural header;
receiving, from a terrain sensor mounted to the reel arm, a first distance between the reel arm and a terrain feature while the reel arm is at the first position;
controlling, via a reel actuator, the reel arm to move between the first position and a second position relative to the frame of the agricultural header;
receiving, from the reel sensor, the second position of the reel arm of the agricultural header relative to the frame of the agricultural header;
receiving, from the terrain sensor, a second distance between the reel arm and the terrain feature while the reel arm is at the second position;
determining a calibration curve indicative of a plurality of offset distances of the reel arm based on the first position of the reel arm, the first distance between the reel arm and the terrain feature, the second position of the reel arm, and the second distance between the reel arm and the terrain feature; and
selecting an offset distance of the plurality of offset distances based on an operational position of the reel arm and the calibration curve.

12. The method of claim 11, comprising:
receiving, from the reel sensor, one or more additional position signals, wherein each position signal of the one or more additional position signals is indicative of an additional position of the reel arm;
receiving, from the terrain sensor, one or more additional distance signals, wherein each distance signal of the one or more additional distance signals is indicative of an additional distance between the reel arm and the terrain feature; and
determining the calibration curve indicative of the plurality of offset distances of the reel arm based on the first position of the reel arm, the first distance between the reel arm and the terrain feature, the second position of the reel arm, the second distance between the reel arm and the terrain feature, each additional position of the reel arm, and each additional distance between the reel arm and the terrain feature.

13. The method of claim 12, wherein the first distance between the reel arm and the terrain feature comprises a minimum distance between the reel arm and the terrain feature, the second distance comprises a maximum distance between the reel arm and the terrain feature, and each additional distance is between the minimum distance and the maximum distance.

14. The method of claim 11, comprising detecting the first distance between the reel arm and the terrain feature, the second distance between the reel arm and the terrain feature, or both, by emitting infrared light, ultraviolet light, sound waves, or a combination thereof, from the terrain sensor toward the terrain feature.

15. The method of claim 11, comprising controlling, via the reel actuator, the reel arm to move between the first position and the second position while the agricultural header is stationary to facilitate determining the calibration curve, and selecting the offset distance as the agricultural header travels through a field.

16. The method of claim 11, comprising controlling a height of the agricultural header based on the offset distance.

17. A non-transitory computer readable storage medium for an agricultural header comprising instructions that, when executed by a processor, cause the processor to:
receive, from a reel sensor, a first position signal indicative of a first position of a reel arm of the agricultural header;
receive, from a terrain sensor mounted to the reel arm, a first distance signal indicative of a first distance between the reel arm and a terrain feature while the reel arm is at the first position;
receive, from the reel sensor, a second position signal indicative of the second position of the reel arm;
receive, from the terrain sensor, a second distance signal indicative of a second distance between the reel arm and the terrain feature while the reel arm is at the second position;
determine a calibration curve indicative of a plurality of offset distances of the reel arm based on the first position of the reel arm, the first distance between the reel arm and the terrain feature, the second position of the reel arm, and the second distance between the reel arm and the terrain feature; and
select an offset distance of the plurality of offset distances based on an operational position of the reel arm and the calibration curve; and
control a height of the agricultural header based on the offset distance.

18. The non-transitory computer readable storage medium of claim 17, comprising instructions that, when executed by the processor, cause the processor to:
receive, from the reel sensor, one or more additional position signals, wherein each position signal of the one or more additional position signals is indicative of an additional position of the reel arm;
receive, from the terrain sensor, one or more additional distance signals, wherein each distance signal of the one or more additional distance signals is indicative of an additional distance between the reel arm and the terrain feature; and determine the calibration curve indicative of the plurality of offset distances of the reel arm based on the first position of the reel arm, the first distance between the reel arm and the terrain feature, the second position of the reel arm, the second distance between the reel arm and the terrain feature, each additional position of the reel arm, and each additional distance between the reel arm and the terrain feature.

19. The non-transitory computer readable storage medium of claim 18, wherein the first distance between the reel arm and the terrain feature comprises a minimum distance between the reel arm and the terrain feature, the second distance comprises a maximum distance between the reel arm and the terrain feature, and each additional distance is between the minimum distance and the maximum distance.

20. The non-transitory computer readable storage medium of claim 17, wherein the first position of the reel arm comprises a minimum position of the reel arm along a vertical axis of the agricultural header, and the second position of the reel arm comprises a maximum position of the reel arm along the vertical axis of the agricultural header.

* * * * *